United States Patent [19]

Jacobson et al.

[11] 4,168,071

[45] Sep. 18, 1979

[54] THERMAL ISOLATOR

[75] Inventors: Jerome Jacobson, San Jose; Charles W. Dillmann, Los Gatos, both of Calif.

[73] Assignee: General Electric Company, San Jose, Calif.

[21] Appl. No.: 887,471

[22] Filed: Mar. 17, 1978

[51] Int. Cl.² .................. F16J 15/14; F22B 37/22
[52] U.S. Cl. ............................... 277/22; 277/15; 277/71; 122/365
[58] Field of Search .................. 122/365; 165/81–83; 277/22, 59, 12, 70, 71, 72 R, 72 FM, 79, 15, 17, 18, 135, 226, 212 F

[56] References Cited

U.S. PATENT DOCUMENTS

| 2,203,357 | 6/1940 | Kerr | 122/365 |
|---|---|---|---|
| 2,252,069 | 8/1941 | Fletcher | 122/365 |
| 2,331,932 | 10/1943 | Rowand | 122/365 |
| 3,414,274 | 12/1968 | Aronson | 277/15 |
| 3,951,419 | 4/1976 | Abrahams et al. | 277/135 |
| 4,005,747 | 2/1977 | Ball | 277/22 X |

FOREIGN PATENT DOCUMENTS

| 25141 | 10/1919 | Denmark | 277/12 |
|---|---|---|---|
| 52-25518 | 7/1977 | Japan | 122/365 |
| 395626 | 7/1933 | United Kingdom | 277/71 |

*Primary Examiner*—Robert S. Ward, Jr.
*Attorney, Agent, or Firm*—Ivor J. James, Jr.; Samuel E. Turner; Sam E. Laub

[57] ABSTRACT

In an arrangement for feeding a fluid at a given temperature into a vessel containing fluid at a different temperature from an inlet pipe through an inlet nozzle to feedfluid distribution means in the vessel, a removable thermal isolator arrangement is provided. Spaced concentric sleeves form a series of fluid spaces which thermally insulate the inner surface of the nozzle from the feedfluid and leakage feedfluid is directed away from the nozzle whereby thermal cycling of the inner surface of the nozzle is minimized to eliminate cracking thereof.

5 Claims, 3 Drawing Figures

THERMAL ISOLATOR

BACKGROUND OF THE INVENTION

In a number of industrial processes a relatively cool feed fluid is fed into a vessel and mixed with the hotter fluid therein. Examples include heat exchangers and steam generators. For example, in a steam generator such as a boiling water nuclear reactor the heat source is a nuclear fuel core contained in a pressure vessel. Typically, a feedwater pipe is connected to the pressure vessel by a reinforcing inlet nozzle welded between the feedwater pipe and the wall of the vessel. Feedwater is fed from the feedwater pipe through the nozzle by means of a section of pipe called a thermal sleeve, the upstream end of which is inserted in the nozzle and the downstream end of which is connected to feedwater distribution means such as sparger having a plurality of relatively small outlets or nozzles by which the cool feedwater is mixed with the hot water in the vessel. Prior thermal sleeve arrangements are shown, for example, in Japanese Pat. No. SHO-52-25518.

In a number of instances after extended use, cracks have been discovered along the inner surface of the inlet nozzle. As explained in greater detail hereinafter, these cracks are believed to be the result of thermal cycling of the inner portion of the nozzle by alternate exposure to the hot water in the vessel and to the relatively cooler feedwater or water cooled by the feedwaer.

An object of this invention is to provide a thermal isolator arrangement which substantially eliminates thermal cycling of the inner portion of the inlet nozzle.

SUMMARY

The thermal isolator of the invention includes a sparger pipe removably inserted in the inlet nozzle with a first sealing ring between the upstream end of the sparger pipe and the nozzle, the downstream end of the sparger pipe being connected to a sparger segment. Concentric with and spaced from the sparger pipe is a first sleeve surrounding the sparger pipe and providing a first fluid space. A second sealing ring arrangement provides a seal between the first sleeve and the inner surface of the nozzle downstream from the seal between the sparger pipe and the nozzle. This provides an annular cavity for collecting feedwater which leaks past the first sealing ring. Openings in the portion of the first sleeve adjacent the cavity direct feedwater leakage flow into the first fluid space and thence out the open downstream end of the first sleeve into the vessel interior. Thus flow of leakage coolant over the inner surface of the inlet nozzle is prevented. A second sleeve concentric with and spaced radially outward from the first sleeve provides a second fluid space therebetween as well as a third fluid space between the second sleeve and the inner surface of the nozzle. The three fluid spaces, isolated from one another by the spaced sleeves provide thermal insulation of the nozzle from the feedwater in the sparger pipe.

The invention is described in greater detail hereinafter with reference to the accompanying drawing wherein.

DESCRIPTION

Figure 1:
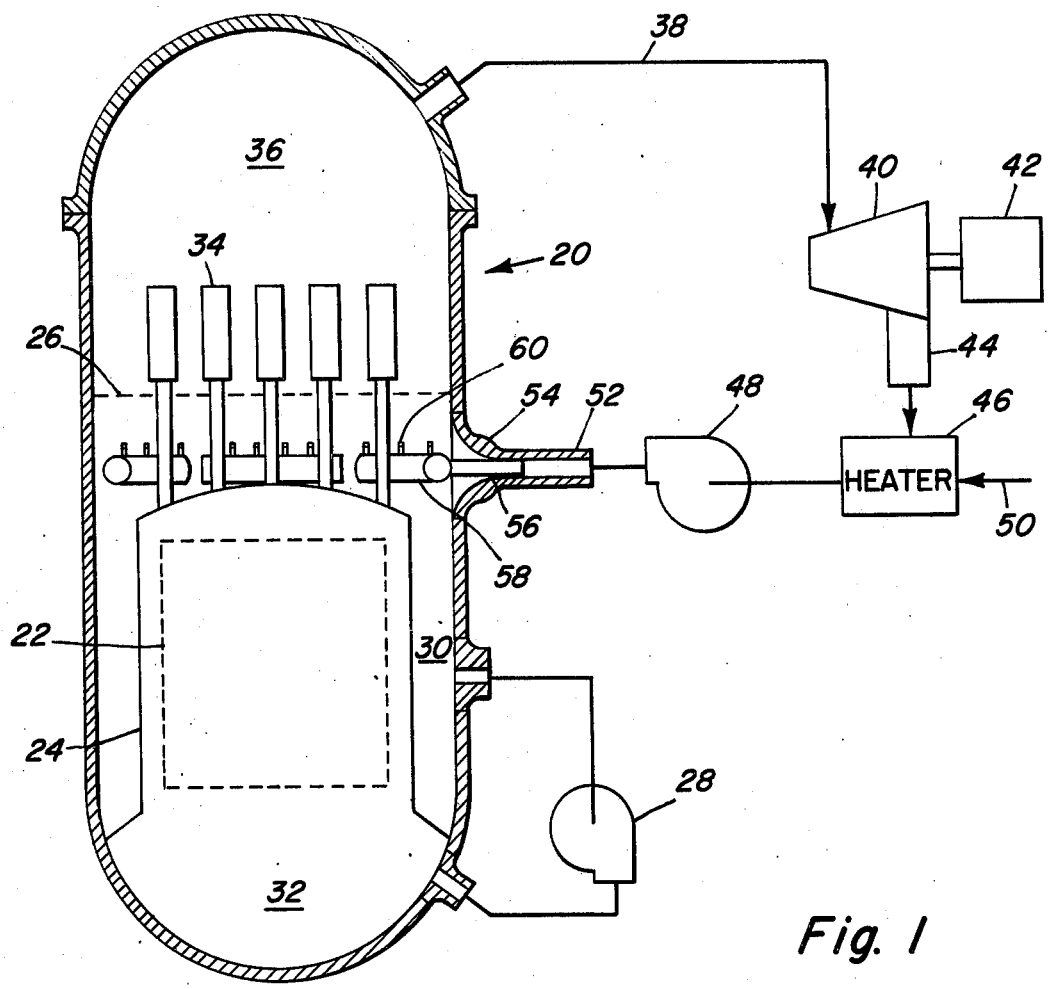
FIG. 1 is an illustration of a steam generator system.

Shown in FIG. 1 is a representative heat exchanger or steam generator arrangement. Housed in a pressure vessel 20 is a heat source 22 (indicated by dashed lines) which may be, for example, a nuclear reactor core. The heat source 22 is surrounded by a shroud 24. The vessel is filled to a level indicated by a dashed line 26 with a vaporizable working fluid such as water. The water is circulated through the heat source 22 by a pump 28 which takes water from an annulus 30 and pressurizes a lower plenum 32 whereby the water is forced through the heat source and a portion thereof is vaporized. The resulting steam-water mixture passes through a plurality of steam separators 34. The steam is collected in an upper plenum 36 while the extracted water returns to the water pool in the vessel. Steam is taken from the upper plenum 36 through a steam line 38 and applied to a utilization device such as a turbine 40 driving an electrical generator 42. The turbine exhaust steam is condensed in a condenser 44 and is returned as feedwater to the vessel 20 through one or more feedwater heaters 46 and a pump 48. Makeup water may be received by the feedwater heater 46 through a line 50 from a suitable source (not shown).

Shown in elementary form in FIG. 1 is an arrangement by which the feedwater is fed into the vessel 20. The feedwater is received from pump 48 through a feedwater pipe 52. Connected (as by welding) as a reinforcing transition member between the pipe 52 and the vessel wall is an inlet nozzle 54. Removably fitted into the nozzle 54 is a sparger pipe 56, the downstream end of which is connected to an arcuate sparger segment 58 of a feedwater distribution sparger ring. (The sparger pipe 56 is sometimes called a "thermal sleeve".) The feedwater exits the sparger segment through a series of holes or elbow-shaped sparger nozzles 60 whereby the feedwater is distributed and mixed with the circulating water in the vessel 20. (Similar inlet nozzle and sparger pipe arrangements, not shown, supply feedwater to the other sparger segments of the sparger ring.)

Figure 2:
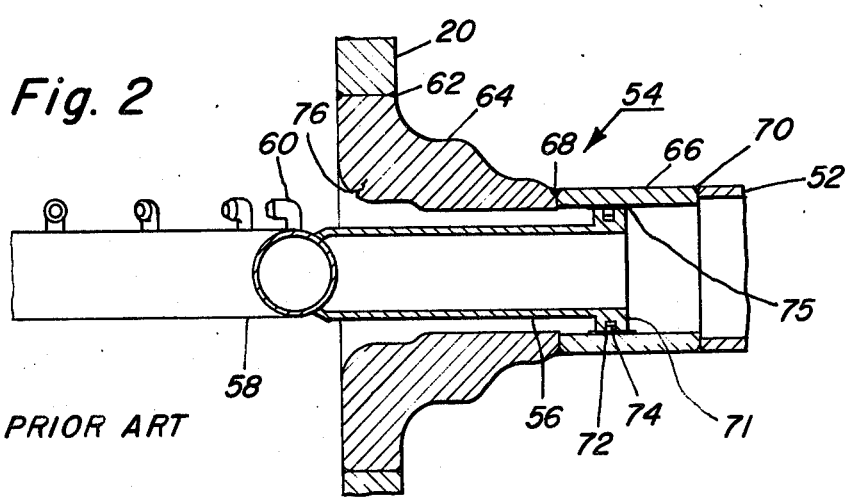
FIG. 2 is a longitudinal cross section illustration of an inlet nozzle-sparger arrangement of the prior art.

A prior art inlet nozzle-sparger arrangement is shown in greater detail in FIG. 2. The inlet nozzle 54 is welded to the wall of the vessel 20 by a weld 62. The nozzle 54 includes a main portion 64 and an outer portion 66 welded together by a weld 68. The outer portion 66 is welded to the feedwater pipe 52 by a weld 70. The vessel wall and the main portion 64 are normally formed of low alloy steel, the welds in which must be post-weld heat treated. The outer portion 66, sometimes called a "safe end", and the feedwater pipe 52 are normally formed of carbon steel, the welds in which do not require post-weld heat treatment. Thus the welds 62 and 68 can be made and heat treated in the factory while the weld 70 can be made in the field without heat treatment.

As mentioned hereinbefore it is highly desirable that the sparger segment 58 with sparger pipe 56 be readily removable. This is desirable to provide for inspection, service and replacement (if necessary) of the sparger segment and pipe and also to provide access for inspection and service of the inlet nozzle 54.

To provide removability of the sparger segment and pipe the upstream end of the sparger pipe 56 is formed with an enlarged or flanged portion 71 which may be circumferentially grooved to receive a resilient sealing ring 72 (such as a well-known split steel ring), the sealing ring being urged into engagement with the adjacent inside surface of the nozzle 54 by a resilient backing ring 74. Preferably the adjacent inside surface of the nozzle 54 upon which the sealing ring 72 seats is provided with an overlay layer 75 of, for example, stainless steel as a suitable wear surface.

In use, for example, in a boiling water nuclear reactor, the feedwater inlet arrangement is subject to the following typical conditions: The vessel pressure is about 1000 psi and the temperature of the water therein is in the order of 540 degrees F. The pressure of the feedwater, in the feedwater pipe 52, is about 25 psi greater than the vessel pressure and the temperature of the feedwater varies from about 70° to about 420 degrees F. depending upon operating conditions.

After extended operation of the prior art arrangement of FIG. 2 under such typical conditions, the development of cracks, such as a crack 76, along the downstream inner surface of the inlet nozzle 54 was discovered. Tests, including local temperature measurements with thermocouples, support the proposition that the development of such cracks is due to thermal cycling of these nozzle surfaces. It is believed that such thermal cycling results from the following considerations: The seal of the sparger pipe 56 in the nozzle 54 by the flange portion 71 and/or the sealing ring 72 is not perfect. Thus there is a leakage flow of an amount of the relative cool feedwater past the flanged portion 71 and along the upstream inner surfaces of the nozzle 54 until it mixes with the hot water in the vessel. However, because of the turbulent fluid flow conditions in the vessel, the boundary between the cool feedwater leakage flow and the hot vessel water is highly unstable. Thus the inner surfaces of the nozzle 54 are intermittently exposed first to the cool feedwater leakage and then to the hot vessel water.

An attempt to solve the feedwater leakage flow problem by welding the upstream end of the sparger pipe 56 to the nozzle 54 (as shown for example in FIG. 1 of Japanese Pat. No. SHO-52-25518) resulted in the discovery of another effect. Because of heat transfer through the walls of sparger pipe 56, a layer of relatively cool water is formed around the outside surface of the pipe, particularly around the upstream end thereof. It is believed that this layer of cooled water builds up then intermittently tears away and washes over the inner surfaces of the nozzle 54 with the result that these inner surfaces are subjected to thermal cycling even though the feedwater leakage flow is eliminated by welding of the sparger pipe 56 to the nozzle 54.

Figure 3:
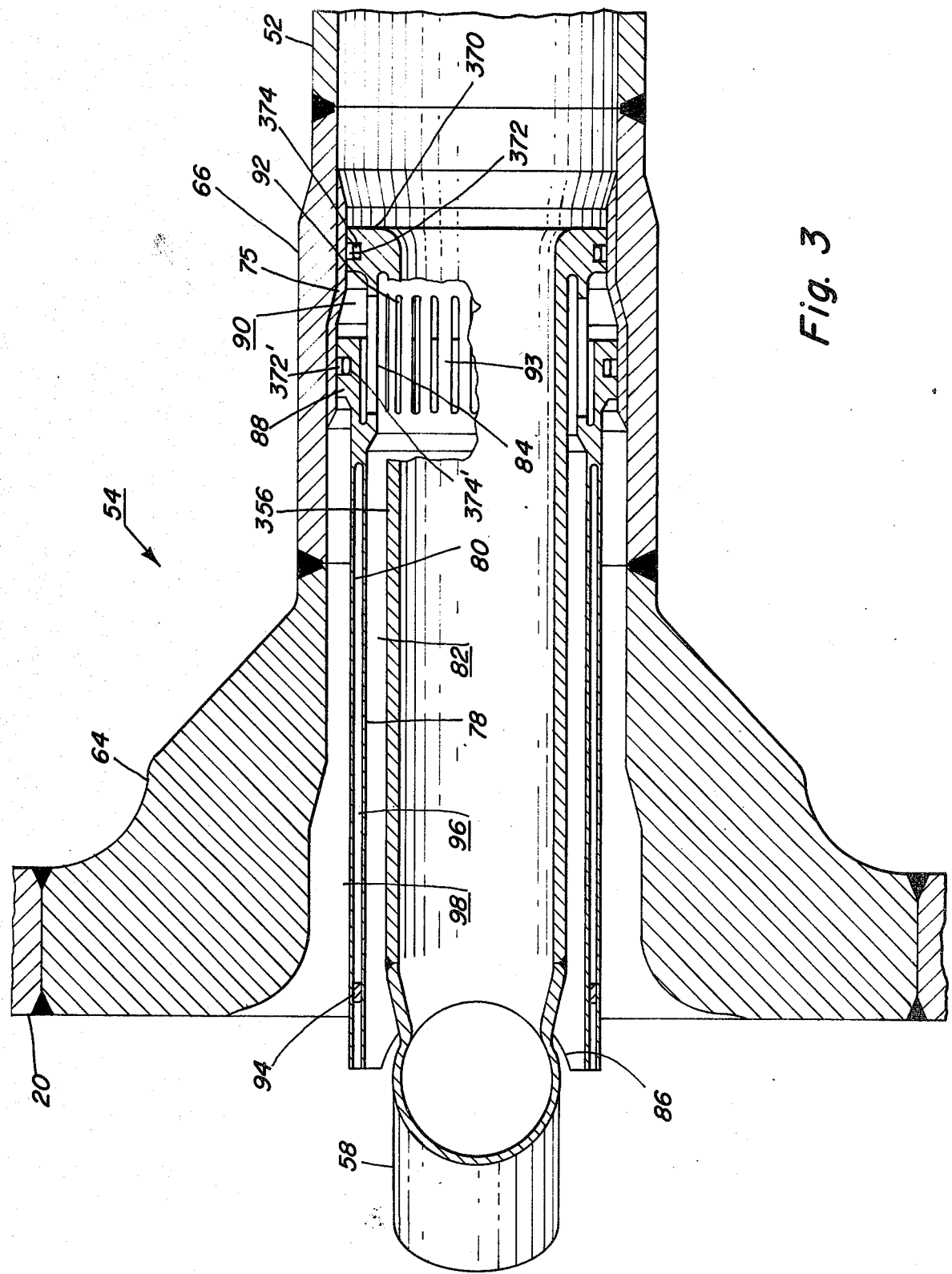
FIG. 3 is a partly cut away longitudinal cross section view of a thermal isolator arrangement of the invention.

With the foregoing discussion as background, attention is directed to FIG. 3 wherein is illustrated the thermal isolator arrangement of the invention whereby thermal cycling of the inlet nozzle inner surfaces is substantially decreased and development of cracks therein is substantially eliminated.

As in FIGS. 1 and 2 the inlet nozzle 54 includes outer portion or safe end 66 welded to feedwater pipe 52 and a main portion 64 welded to the pressure vessel 20, an inner surface of the nozzle being clad with the layer 75 of stainless steel to provide a seating surface for sealing rings.

The thermal isolator of the invention includes a sparger pipe 356 and a pair of spaced sleeves 78 and 80. The sparger pipe 356 is similar to the sparger pipe 56 of FIG. 2 being welded to the sparger segment 58 at its downstream end and being formed with an enlarged or flanged portion 370 at its upstream end. The flanged portion 370 is formed with a circumferential groove to contain a first sealing ring 372 in engagement with the inner surface of the nozzle. A backing spring 374 may be provided to aid the engagement of the sealing ring 372.

The first sleeve 78 is positioned concentric with the sparger pipe 356 and it is secured (as by welding) to the flanged portion 370 at its upstream end. Thus the arrangement forms a first annular fluid or water space 82 between sleeve 78 and the sparger pipe 356. (In the illustrated embodiment an upstream portion 84 of the sleeve 78 is of reduced diameter. In the particular embodiment this is done because of space considerations and to provide the downstream part of the fluid space 82 with a relatively large transverse cross section area. However, the reduced diameter of portion 84 is not a requirement.) At its downstream end the first sleeve 78 is substantially open to the interior of the pressure vessel and it is formed with an arcuate cutout 86 matched to the diameter of the sparger segment 58 by which it is thus supported.

Secured to the first sleeve 78, downstream of the portion 84 thereof, is a sealing ring flange 88 formed with a circumferential groove containing a second sealing ring 372' in engagement with the inner surface of the nozzle 54. A backing spring 374' may be provided to aid the engagement of the sealing ring 372'. This arrangement thus forms an annular fluid cavity 90 bounded by the sealing ring flanges 88 and 370, the inner surface of nozzle 54 and the upstream portion 84 of the first sleeve 78.

To provide a fluid flow passage from the cavity 90 into the first fluid space 82 the portion 84 of sleeve 78 is formed with a series of openings or slots 92.

Thus in operation, feedwater leakage flow past the first seal ring 372 enters the cavity 90 and is directed therefrom through the slots 92 and the first fluid space 82 into the pressure vessel. Furthermore, contrary to what might be expected, it is found that fluid flow in the vessel past the open downstream end of the first sleeve 78 reduces the pressure in the first fluid space 82 and in the cavity 90. As a result, leakage flow past the second sealing ring 372' is from the vessel interior into the cavity 90. This secondary leakage flow also exits the cavity 90 through slots 92 and fluid space 82 and is returned to the interior of the vessel.

(It is noted that the sealing ring flange 88 is formed with an offset toward the upstream end. This is not an essential feature but is done in this particular embodiment to bring the second sealing ring 372' in contact with the layer 75 without the need to lengthen the layer 75 while still providing a sufficient length of the portion 84 of first sleeve 78 for the slots 92.)

The fluid passage area provided by slots 92 should be large, preferably about equal to the transverse cross section area of the fluid space 82, to avoid pressure drop across the slots. In addition to directing the leakage flow into the fluid space 82, this slot arrangement performs another function. The flanged portion 370 (containing the first sealing ring 372) and the flange 88 (containing the second sealing ring 88) operate at different temperatures. To accommodate the resulting thermally induced differential movement of these members, the length and width of the metal strips or lands 93 between slots 92 are selected so that these strips act as somewhat resilient beams but with sufficient stiffness to avoid vibration.

To isolate further the inner surfaces of the nozzle 54 from the thermal cycling effects of the cool feedwater the second sleeve 80 may be provided. Sleeve 80 is positioned concentric with and spaced outwardly from the first sleeve 78 and it is secured at its upstream end (as by welding) to the sealing ring flange 88. The sleeve 80 is open at its downstream end, which end may be supported by spacer blocks 94 between the sleeves 80 and 78. Thus the second sleeve 80 forms with the first sleeve 78 a second fluid space 96 and a third fluid space 98 is formed between the second sleeve 80 and the inner surface of the nozzle 54. These three fluid spaces, isolated from one another by the sleeves 78 and 80, provide a high degree of thermal insulation to eliminate substantially the thermal cycling of the inner surfaces of the nozzle 54 due to the cool feedfluid through the sparger pipe 356.

In a production example of a thermal isolator as shown in FIG. 3, the sparger pipe 356 is formed of stainless steel with an outside diameter of about 22 cm. The first sleeve 78 is formed of stainless steel with an inside diameter of about 29.9 cm and a wall thickness of about 0.6 cm. The second sleeve 80 is formed of stainless steel with an inside diameter of about 30.3 cm. The nominal diameter of the first sealing ring 372 is 28 cm while the nominal diameter of the second sealing ring 372' is 29.5 cm. The slots 92 are about 0.6 cm wide and about 10 cm in length. The strips 93 are about 2.7 cm wide and about 0.6 cm thick. The flange portion 370, the flange 88 and the upstream portion 84 of sleeve 78 are formed of a NI-CR-FE alloy and they are secured to sleeves 78 and 80 by welds (not shown).

Thus what has been described is a thermal isolator arrangement for passing feedfluid from an inlet pipe through an inlet nozzle to a fluid distribution sparger in a pressure vessel while providing thermal isolation of the nozzle inner surfaces from the cool feedfluid.

What is claimed is:

1. In an arrangement for feeding a feedfluid into a fluid-containing pressure vessel and mixing the feedfluid with the fluid in the vessel wherein the feedfluid is received through an inlet pipe connected to said vessel by a nozzle and is directed through a sparger pipe inserted in said nozzle, a thermal isolator arrangement comprising: a first seal means between the upstream end of said sparger pipe and said nozzle, said first seal means being imperfect whereby an amount of said feedfluid leaks past said first seal means; an elongated first sleeve positioned substantially concentric with said sparger pipe and spaced therefrom to form a first annular fluid space, said first sleeve being sealed to said sparger pipe at the upstream end thereof, said first annular fluid space being substantially open to said vessel at its downstream end; second seal means between said first sleeve and said nozzle downstream of said first seal means whereby an annular cavity is formed bounded by said first and second seal means, an upstream portion of said first sleeve and a portion of said nozzle, said second seal means being imperfect whereby differential pressure thereacross causes leakage of an amount of said fluid past said second seal; and a fluid passage in said portion of said first sleeve adjacent said annular cavity communicating with said first annular fluid space whereby fluid leakage flow into said annular cavity is directed through said fluid passage and through said first annular fluid space into said vessel.

2. The combination of claim 1 wherein said first sleeve extends into said vessel beyond the inside edge of said nozzle.

3. The combination of claim 1 further including an elongated second sleeve positioned substantially concentric with said first sleeve and spaced therefrom to form a second annular fluid space, said second sleeve being sealed to said first sleeve toward the upstream end thereof, said second annular fluid space being substantially open to said vessel at its downstream end.

4. The combination of claim 1 wherein said fluid passage comprises a series of longitudinally elongated, circumferentially spaced slots in said portion of said first sleeve.

5. The combination of claim 1 wherein said first sleeve is formed with a cut portion at its downstream end, said cutout portion generally conforming to the outside diameter of a sparger segment secured to the downstream end of said sparger pipe whereby said downstream end of said first sleeve is supported by said sparger segment.

* * * * *